United States Patent [19]

Eckle

[11] 4,265,574
[45] May 5, 1981

[54] COMBINED BORING AND MILLING TOOL

[75] Inventor: Otto Eckle, Loechgau, Fed. Rep. of Germany

[73] Assignee: Komet Stahlhalter- und Werkzeugfabrik Robert Breuning GmbH, Besigheim, Fed. Rep. of Germany

[21] Appl. No.: 86,488

[22] Filed: Oct. 19, 1979

[30] Foreign Application Priority Data

Nov. 7, 1978 [DE] Fed. Rep. of Germany ... 7833000[U]

[51] Int. Cl.³ .................... B23B 51/00; B26D 1/12
[52] U.S. Cl. ............................ 408/188; 408/189;
408/224; 408/239 R; 408/713; 407/48; 407/54;
407/61
[58] Field of Search ............... 408/188, 189, 223, 224,
408/227, 228, 229, 231, 233, 239, 705, 713;
407/48, 53, 54, 55, 56, 61

[56] References Cited

U.S. PATENT DOCUMENTS

| 2,630,725 | 3/1953 | Black | 408/224 |
|---|---|---|---|
| 3,354,526 | 11/1967 | Erkfritz | 408/239 |
| 3,811,163 | 5/1974 | Frederick et al. | 407/54 |
| 3,963,366 | 6/1976 | Eckle | 408/713 |
| 4,093,392 | 6/1978 | Hopkins | 407/48 |
| 4,105,357 | 8/1978 | Kehl | 408/188 |
| 4,108,567 | 8/1978 | Faber | 408/224 |

FOREIGN PATENT DOCUMENTS

| 2044012 | 3/1972 | Fed. Rep. of Germany . | |
| 2317568 | 10/1974 | Fed. Rep. of Germany | 408/224 |
| 2358048 | 5/1975 | Fed. Rep. of Germany | 408/223 |
| 2610006 | 9/1976 | Fed. Rep. of Germany . | |

Primary Examiner—Harrison L. Hinson
Attorney, Agent, or Firm—Blanchard, Flynn, Thiel, Boutell & Tanis

[57] ABSTRACT

A combined boring and milling tool has at least three triangularly shaped turnable cutter blades. The effective cutting edge of the first turnable cutter blade extends as bit (or drilling cutting edge) from the periphery of the shank at least to its axis. A second turnable cutter blade is offset 180° peripherally from the first and its effective cutting edge extends as cutting edge on the periphery of the shank parallel to the shank axis. A third turnable cutter blade is offset axially from the first so that its effective cutting edge extends as a cutting edge parallel to the shank axis. The two effective cutting edges of the second and third turnable cutter blades lie on the same flight circle and their working ranges overlap axially. The first and third turnable cutter blades have a common chip space.

9 Claims, 3 Drawing Figures

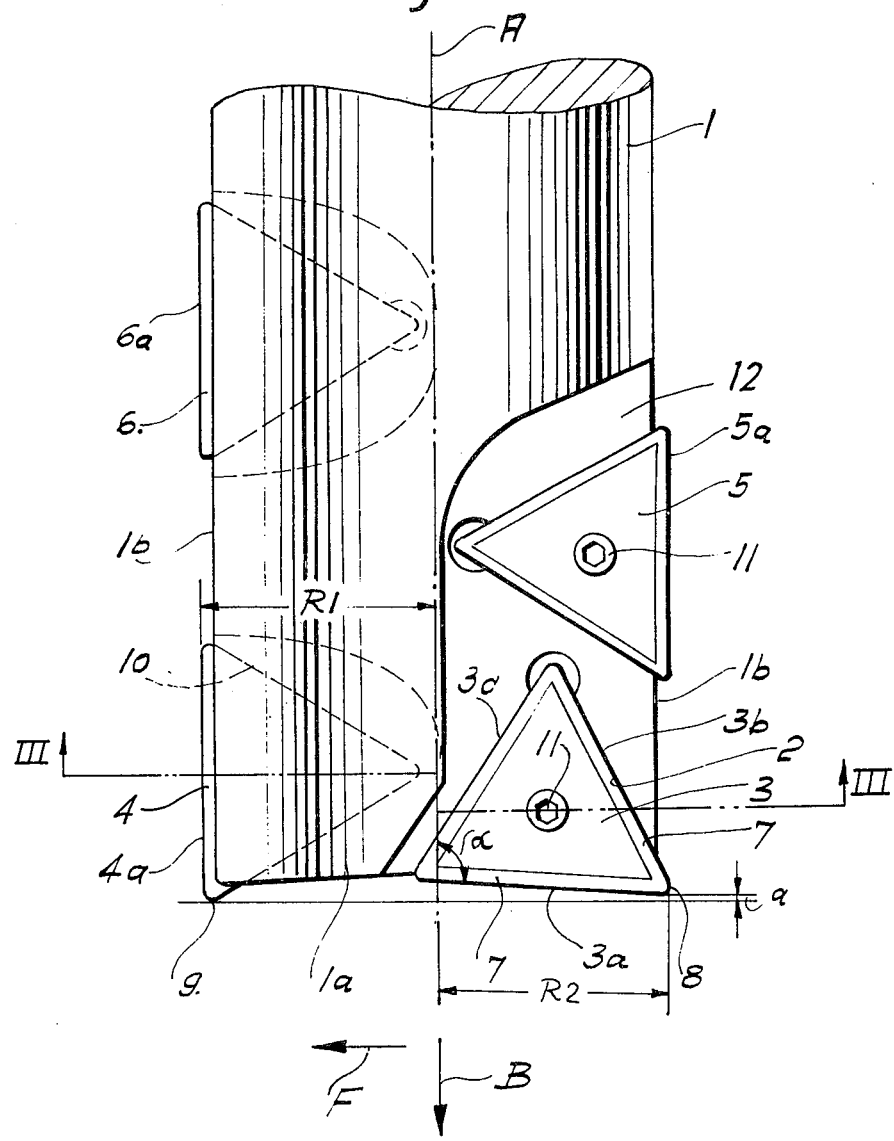

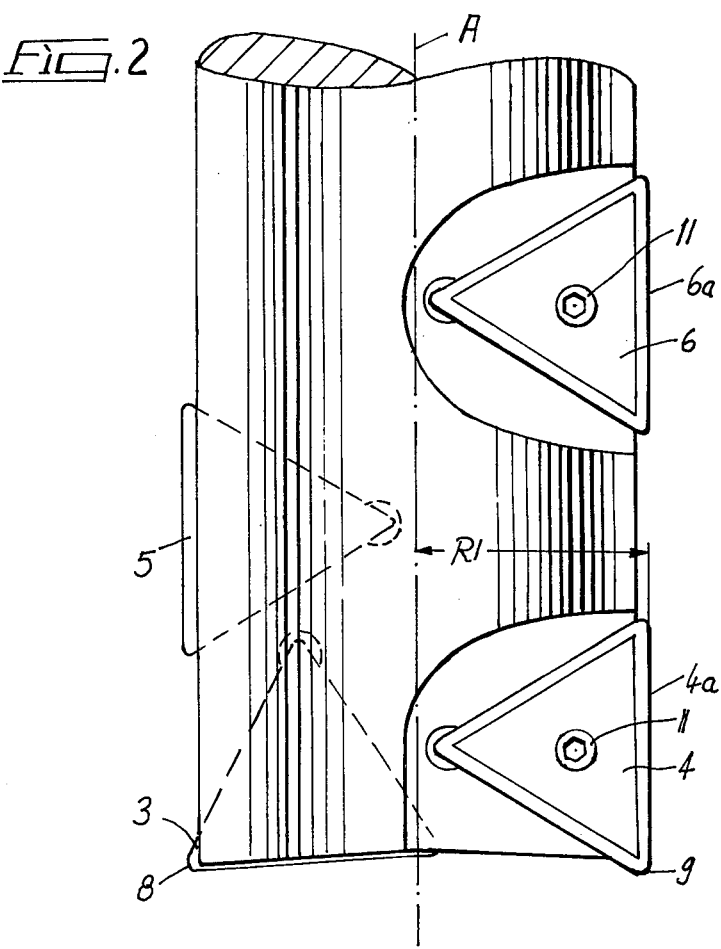
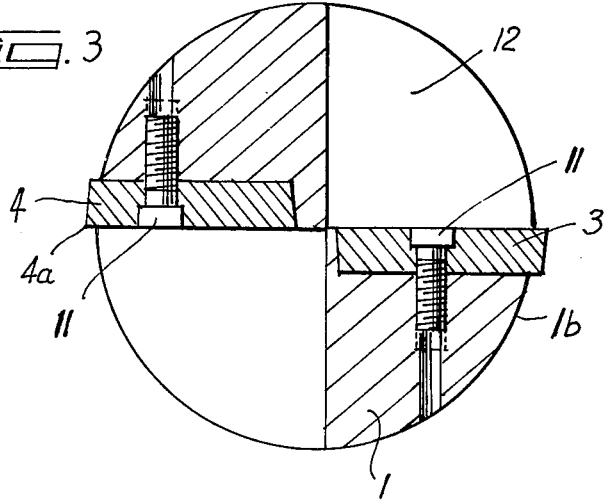

COMBINED BORING AND MILLING TOOL

FIELD OF THE INVENTION

The invention relates to a combined boring and milling tool with a shank, which has cutting edges on its front end and periphery.

BACKGROUND OF THE INVENTION

Such combined boring and milling tools are known, with which one can drill to a limited depth and subsequently by changing the feed direction can mill in a direction perpendicular to the preceding drilling operation. Such combined boring and milling tools are utilized for example for the manufacture of grooves, which do not extend to the outer edge of the workpiece, for example grooves which are designed to receive adjusting springs. The combined boring and milling tool must thus first spot-drill the workpiece at one groove end and must then be fed perpendicularly to the tool axis to mill to the other groove end. There the tool is again drilled axially into the workpiece in order to subsequently be moved again perpendicularly to its shank axis to mill back to the start of the groove. In known combined boring and milling tools, however, the axial feed movement (drilling depth) which can be achieved during drilling, is limited to a few tenths of a millimeter, so that the described boring operation and subsequent milling must be repeated several times during the manufacture of an adjusting-spring groove, which requires considerable machining time. Furthermore, the known combined boring and milling tools consists of a single material, either of a superspeed steel or of hard metal. Such single material tools require not only considerable manufacturing effort but their cutting edges can be reground only with great difficulty and require suitable grinding machines.

The basic purpose of the invention is to produce a combined boring and milling tool of the above-mentioned type, which is less expensive to manufacture and can be serviced easier and which furthermore makes possible greater drilling depth and thereby shortens machining time.

This is achieved according to the invention by the cutting edges being formed as one cutting edge each of respective turnable cutter blades each shaped like an equilateral triangle. A first such turnable cutter blade is located on the front end of the shank so that its effective cutting edge extends as a bit, or drill cutting edge, radially from the periphery of the shank toward its axis, overlaps the shank axis slightly and slopes axially back slightly as it extends radially inward. A second said turnable cutter blade, offset 180° peripherally from the first turnable cutter blade, is offset on the front end of the shank so that its effective cutting edge extends as a cutting edge parallel to the shank axis and projects slightly beyond the periphery of the shank.

Such a combined boring and milling tool is relatively simple to manufacture, because its shank does not need to consist of either superspeed steel or of hard metal. Recesses for receiving the turnable cutter blades need only be milled into the shank. The turnable cutter blades are manufactured on separate machines in large numbers and can be produced very true in size. They are very precisely repeatable when turned or changed on the shank. Since the inventive tool is equipped with turnable cutter blades, it does not need to be reground, but only a turning or changing of the turnable cutter blades is needed. Thus devices for regrinding the tool also are not needed.

A particularly advantageous development consists in the corners of the turnable cutter blades being rounded and the axially front corner of the second turnable cutter blade, slightly projecting axially beyond the radially outer corner of the first turnable cutter blade. Through this it is achieved that during drilling the radially outer corner of the first turnable cutter blade is relieved, because the axially front corner of the second turnable cutter blade cuts first a circular groove into the workpiece as the tool is moved into the workpiece. Furthermore, it is achieved during milling that the base of the groove is worked only by the front corner of the second turnable cutter blade, so that a clean and smooth surface is created.

Since the inventive combined boring and milling tool has a completely and correctly constructed bit, or drill cutting edge, greater drilling depths can also be achieved in one operation. Thus an adjusting-spring groove can be manufactured with the new boring tool so that the new tool first drills to the full depth of the desired groove and then, by a subsequent movement of the tool perpendicular to its axis of rotation, the groove is milled at full depth. Also, the inventive tool has the efficiency of a hard metal tool, and thus it permits cutting speeds and feed rates as exist with hard metal tools.

This is true for both the drilling and milling operations. The use of turnable cutter blades with the shape of an equilateral triangle has the advantage that same requires relatively little space and can be located without hindrance on the shank of the tool.

It should be mentioned that turnable cutter blades have already been used in tools intended either for only drilling or for only milling. If one wants to manufacture, for example, adjusting grooves with such tools, then it is necessary after the drilling to exchange the boring tool with a milling tool. The time-wasting required for tool changing is avoided by the inventive tool.

BRIEF DESCRIPTION OF THE DRAWINGS

The invention will be discussed in more detail hereinbelow with reference to one exemplary embodiment which is illustrated in the drawings.

FIG. 1 is a top view of a boring and milling tool embodying the invention,

FIG. 2 is a top view in which the tool is rotated 180° about its axis A,

FIG. 3 is a cross-sectional view along the line III—III of FIG. 1

DETAILED DESCRIPTION

The drawing shows a side view of the inventive combined boring and milling tool. The shank 1 has at its front end 1a a first recess 2 for receiving a first turnable cutter blade 3, which consists of a hard metal. The turnable cutter blade 3, just like all other turnable cutter blades used in the combined boring and milling tool, has the shape of an equilateral triangle. Each side edge of this triangle forms a cutting edge. The cutting edges of the turnable cutter blade 3 are identified by the reference numerals 3a, 3b, 3c. The turnable cutter blade 3 preferably has on each cutting edge 3a, 3b, 3c chip-guiding surfaces 7, which extend to the corners 8. The same is true of the remaining cutter blades 4, 5, 6. Furthermore the corners 8 of the turnable cutter blades 3–6 are preferably rounded off, as shown in the drawing. Each turnable cutter blade 3-6 preferably has a center opening and is fastened on the shank 1 by a holding screw 11, the head of which is arranged substantially sunk into the turnable cutter blade.

The turnable cutter blade 3 is now arranged on the front end 1a of the shank 1, so that its effective cutting edge 3a extends as a boring edge, or bit, radially from the circumference 1b of the shank toward its axis A and slightly overlaps said axis. The cutting edge 3a is thereby arranged such that it slightly axially slopes rearward, from its radially outer end to its radially inner end. This means that the angle α, which the effective cutting edge 3a defines with the shank axis A, is slightly larger than 90°, preferably approximately 92°–95°. In this way, during boring the small part of the cutting edge projecting beyond the shank axis A runs free and does not come into contact with the workpiece.

The second turnable cutter blade 4 is arranged on the front end 1a of the shank in a further recess 10 offset 180° circumferentially of the shank from the recess 2, so that its effective cutting edge 4a extends parallel to the shank axis A and projects slightly beyond the circumference 1b of the shank. Furthermore, however, the second turnable cutter blade 4 is arranged advantageously so that its corner 9, which in axial direction is its front corner, projects axially of the shank beyond the radially outer corner 8 of the first turnable cutter blade 3 by the amount a, for example by approximately 0.1 –0.3 mm.

To manufacture the adjusting-spring groove mentioned above, the inventive rotating tool is fed for drilling in the direction B. The slightly projecting corner 9 of the second cutter blade 5 thereby penetrates first into the workpiece and cuts an annular groove.

Directly thereafter the effective cutting edge 3a of the first turnable cutter blade 3, i.e. the bit, also penetrates into the workpiece and drills same. The corner 9 of the second turnable cutter blade always preceeds the radial outer cutting edge 8 of the first turnable cutter blade and forms the mentioned annular groove. When the desired depth of the adjusting-spring groove is reached, the drilling feed is turned off and the milling feed is switched on, so that now the tool moves in direction F perpendicular to the shank axis. The effective cutting edge 4a of the turnable cutter blade 4, which edge is parallel to the shank peripheral surface, thereby mills a groove into the workpiece, whereby the corner 9 of the turnable cutter blade 4 works the base of the groove. Thus, the adjusting-spring groove can be drilled and milled in one operation to its full depth.

If the desired milling depth is greater than the length of the effective cutting edge 4a of the second turnable cutter blade 4, it is advantageously possible, to provide, on the same radius as the first turnable cutter blade 3, a third turnable cutter blade 5 axially offset therefrom with its effective cutting edge 5a parallel to the shank axis A. If desired, it is also possible to arrange a further turnable cutter blade 6 on the same radius as the second cutter blade 4.

If a third turnable cutter blade 5 is arranged on the same radius as the turnable cutter blade 3, it is advantageous to provide the two turnable cutter blades 3 and 5 a common chip space 12 in the shank, which space 12 extends approximately to the shank axis A.

It may also be mentioned that the effective cutting edge 4a of the second turnable cutter blade 4 advantageously has a slightly larger radial spacing R1 from the shank axis A than the outer corner 8 of the first turnable cutter blade 3, which has the radial spacing R2. Spacing R1 should thereby be larger at approximately 0.1 mm. than spacing R2. The corner 8 of the cutting edge 3a which acts as a bit is in this way further relieved. Furthermore, a clean and stepfree surface of the groove is achieved.

Since the inventive boring tool has a very good metal removal rate, good chip removal is also required. A particularly advantageous further development of the inventive tool provides a chip channel coiled in feed direction and in turning direction and following each of the first and second turnable cutter blades. Further turnable cutter blades are located along the chip channel in such manner that the third turnable cutter blade is associated with the same chip channel as the first cutter blade, but is offset axially and peripherally with respect to same, and that the fourth turnable cutter blade is associated with the same chip channel as the second cutter blade, but is offset axially and peripherally with respect to same.

Although a particular preferred embodiment of the invention has been disclosed in detail for illustrative purposes, it will be recognized that variations or modifications of the disclosed apparatus, including the rearrangement of parts lie within the scope of the present invention.

The embodiments of the invention in which an exclusive property or privilege is claimed are defined as follows:

1. In a combined boring and milling tool, including a shank having cutting edges on its front end and on its periphery, the improvements comprised in that the cutting edges are respectively formed by one cutting edge each of turnable cutter blades each shaped like an equilateral triangle, a first said turnable cutter blade being located on the front end of the shank so that its effective cutting edge extends as a bit radially inward from the periphery of the shank toward the shank axis, overlaps said shank axis slightly and slopes slightly rearward as it extends radially inward, a second said turnable cutter blade offset 180° peripherally from the first turnable cutter blade and located on the front end of the shank so that its effective cutting edge extends as a cutter edge parallel to the shank axis and projects slightly beyond the periphery of the shank.

2. A tool according to claim 1, wherein the corners of the turnable cutter blades are rounded and the axially front corner of the second turnable cutter blade projects axially slightly beyond the radially outer corner of the first turnable cutter blade.

3. A tool according to claim 1, wherein the effective cutting edge of the second turnable cutter blade has a slightly larger radial spacing from the shank axis than the radially outer corner of the first turnable cutter blade.

4. A tool according to claim 1, including further turnable cutter blades offset axially so that their respective active cutting edges extend as cutter edges parallel to the shank axis and are located on the same radius as the effective cutting edge of the second turnable cutter blade.

5. A tool according to claim 4, wherein the third said turnable cutter blade is located on the same radial plane as the first turnable cutter blade.

6. A tool according to claim 4, wherein the first and second turnable cutter blade are each followed by a chip channel, coiled in feed direction and direction of rotation and the further turnable cutter blades are arranged in the course of said chip channel so that the third turnable cutter blade is associated with the same chip channel as the first one, but is arranged offset therefrom axially and peripherally and the fourth turnable cutter blade is associated with the same chip channel as the second one, but is offset therefrom axially and peripherally.

7. A tool according to claim 1, wherein the effective cutting edge of the first turnable cutter blade defines an angle of approximately 92°-95° with the shank axis.

8. A tool according to claim 1, wherein the turnable cutter blades each have a center opening and are each secured on the shank by a holding screw, the head of which is arranged substantially sunk in the turnable cutter blade.

9. A tool according to claim 1, wherein the turnable cutter blades have a chip-guiding surface on each cutting edge extending all the way to the corners of the cutting blade.

* * * * *